(12) United States Patent
Subramani et al.

(10) Patent No.: US 10,778,763 B2
(45) Date of Patent: Sep. 15, 2020

(54) CONTENT ITEM SHARING AND SYNCHRONIZATION SYSTEM WITH TEAM SHARED FOLDERS

(71) Applicant: Dropbox, Inc., San Francisco, CA (US)

(72) Inventors: Anand Subramani, San Francisco, CA (US); Mark Delamere, Sausalito, CA (US); Emil Ibrishimov, Redwood City, CA (US); Francois Alexander Allain, San Francisco, CA (US)

(73) Assignee: Dropbox Inc., San Francisco, CA (US)

( * ) Notice: Subject to any disclaimer, the term of this patent is extended or adjusted under 35 U.S.C. 154(b) by 0 days.

(21) Appl. No.: 16/369,657

(22) Filed: Mar. 29, 2019

(65) Prior Publication Data
US 2019/0230159 A1  Jul. 25, 2019

Related U.S. Application Data

(63) Continuation of application No. 15/242,144, filed on Aug. 19, 2016, now Pat. No. 10,264,067, which is a continuation of application No. 13/891,042, filed on May 9, 2013, now Pat. No. 9,426,216.

(60) Provisional application No. 61/775,658, filed on Mar. 10, 2013.

(51) Int. Cl.
*H04L 29/08* (2006.01)

(52) U.S. Cl.
CPC ...... *H04L 67/1095* (2013.01); *H04L 67/1046* (2013.01)

(58) Field of Classification Search
CPC ... G06Q 10/10; G06F 16/258; H04L 67/1046; H04L 67/1095
See application file for complete search history.

(56) References Cited

U.S. PATENT DOCUMENTS

| | | | |
|---|---|---|---|
| 8,352,566 B2 | 1/2013 | Cohen et al. | |
| 8,370,298 B2 | 2/2013 | Strong et al. | |
| 2004/0107249 A1 | 6/2004 | Moser | |
| 2006/0173932 A1* | 8/2006 | Cortright | G06F 16/258 |
| 2006/0259524 A1 | 11/2006 | Horton | |
| 2008/0071788 A1 | 3/2008 | Muller | |

(Continued)

OTHER PUBLICATIONS

Geyer, W. et al., "Supporting Activity-centric Collaboration through Peer-to-Peer Shared Objects", 2003 ACM, pp. 115-124.

(Continued)

*Primary Examiner* — Clayton R Williams
*Assistant Examiner* — Michael Li
(74) *Attorney, Agent, or Firm* — Hickman Palermo Becker Bingham LLP

(57) ABSTRACT

A content item sharing and synchronization system providing team shared folders is described. Users of the system have access to the team shared folder simply by being a member of a team. A team account manager of the team can grant access to the team shared folder simply by inviting selected users to the team. Similarly, the team account manager can revoke access to the team shared folder simply by removing a user from the team. Unlike typical network file server folders, separate access control list management for the team shared folder apart from user team membership management is not needed to grant and revoke access to the team shared folder, thereby reducing administrative steps necessary to effectively manage access to the team shared folder.

20 Claims, 6 Drawing Sheets

(56) References Cited

U.S. PATENT DOCUMENTS

| | | |
|---|---|---|
| 2009/0138808 A1* | 5/2009 | Moromisato ......... G06Q 10/10 715/758 |
| 2012/0192086 A1 | 7/2012 | Ghods |
| 2012/0284638 A1 | 11/2012 | Cutler |
| 2013/0013560 A1 | 1/2013 | Goldberg |
| 2013/0124638 A1 | 5/2013 | Barreto |
| 2013/0246901 A1 | 9/2013 | Massand |
| 2014/0337482 A1 | 11/2014 | Houston |
| 2017/0048315 A1 | 2/2017 | Subramani et al. |

OTHER PUBLICATIONS

Maruyama, U.S. Appl. No. 15/636,361, filed Jun. 28, 2017, Notice of Allowance, dated Jan. 23, 2020.

\* cited by examiner

US 10,778,763 B2

CONTENT ITEM SHARING AND SYNCHRONIZATION SYSTEM WITH TEAM SHARED FOLDERS

PRIORITY CLAIM

This application claims the benefit under 35 U.S.C. § 120 as a continuation of application Ser. No. 15/242,144, filed on Aug. 19, 2016; which is a continuation of Ser. No. 13/891,042, filed on May 9, 2013, now U.S. Pat. No. 9,426,216, issued on Aug. 23, 2016; which claims the benefit under 35 U.S.C. 119(e) of provisional application 61/775,658, filed on Mar. 10, 2013. The entire contents of each of the above-mentioned applications is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT STATEMENT

A portion of this disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates generally to sharing digital content and, more specifically, to sharing digital content using team shared folders.

BACKGROUND

Historically, users in an organization shared digital content with other users in the organization by hand carrying or otherwise transporting portable physical media such as floppy disks between computers. In recent years, however, data networks that interconnect computers allow users to send digital content to each other without having to transport physical media. For example, a user can send a file to another user as an attachment to an e-mail message. The digital content could include files, documents, audio, video, images, and other types of digital content.

Today, in addition to historical methods, users share digital content by making it available for access on network file servers. Generally, a network file server (or just "file server") is a computer attached to a network providing a central location for shared storage of digital content. Typically, users create, update, modify, and delete shared digital content at the file server from their computer workstations which are also attached to the same network.

For example, a director of a sales department may create a file folder for containing pertinent sales team documents on the shared storage of a company file server for access by members of her sales team. Unfortunately, the sales director may not be able to provide access to the folder to her team members without coordinating with the company IT administrator, who in many organizations is overburdened and overworked. This is because in many organizations only the IT administrator is authorized to change access permissions associated with shared digital content on file servers.

A related problem is that a file server folder may be created with default permissions that are too permissive. For example, the file server folder created by the sales director may have default permissions that allow all employees in the company to access the folder which may not be desired by the sales director. Again, because of company policy, the sales director may have to coordinate with the IT administrator to restrict access to the folder to only her sales team, which can be a frustrating and time-consuming process.

Yet another problem with using network file server folders for sharing content is that users may not have access to the folders when the file server is unavailable or blocked (e.g., when users attempt to access the file server from outside the company network firewall), thereby making the users less productive in disconnected network environments.

What is needed is a solution for sharing digital content within a team of users. The solution should reduce administrative steps necessary to grant and revoke team member access to shared digital content. The solution should also facilitate access to shared content in disconnected network environments. The present invention provides a solution for these and other needs.

SUMMARY OF SOME EMBODIMENTS

A content item sharing and synchronization system providing team shared folders is disclosed and described. The appended set of claims provides a summary of some embodiments of the present invention.

DETAILED DESCRIPTION

Introduction

Referring to the figures, exemplary embodiments of the invention will now be described. The following description will focus on a presently preferred embodiment of the present invention, which implemented in desktop, mobile, and/or server software operating an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Linux, UNIX, Mac OS X, and the like. Therefore, the description of the exemplary embodiments that follows is for purposes of illustration and not limitation. The exemplary embodiments are primarily described with reference to block diagrams or flowcharts. As to the flowcharts, each block within the flowchart represents both a method step and an apparatus element for performing the method step. Depending on the implementation, the corresponding apparatus element may be configured in hardware, software, firmware, or combinations thereof.

Computer-Based Implementation

The computer-implemented techniques of the present invention may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer system, server computer systems, portable computer systems, handheld electronic devices, networking devices or any other computing device that incorporates hard-wired and/or program logic to implement the techniques.

Figure 1:
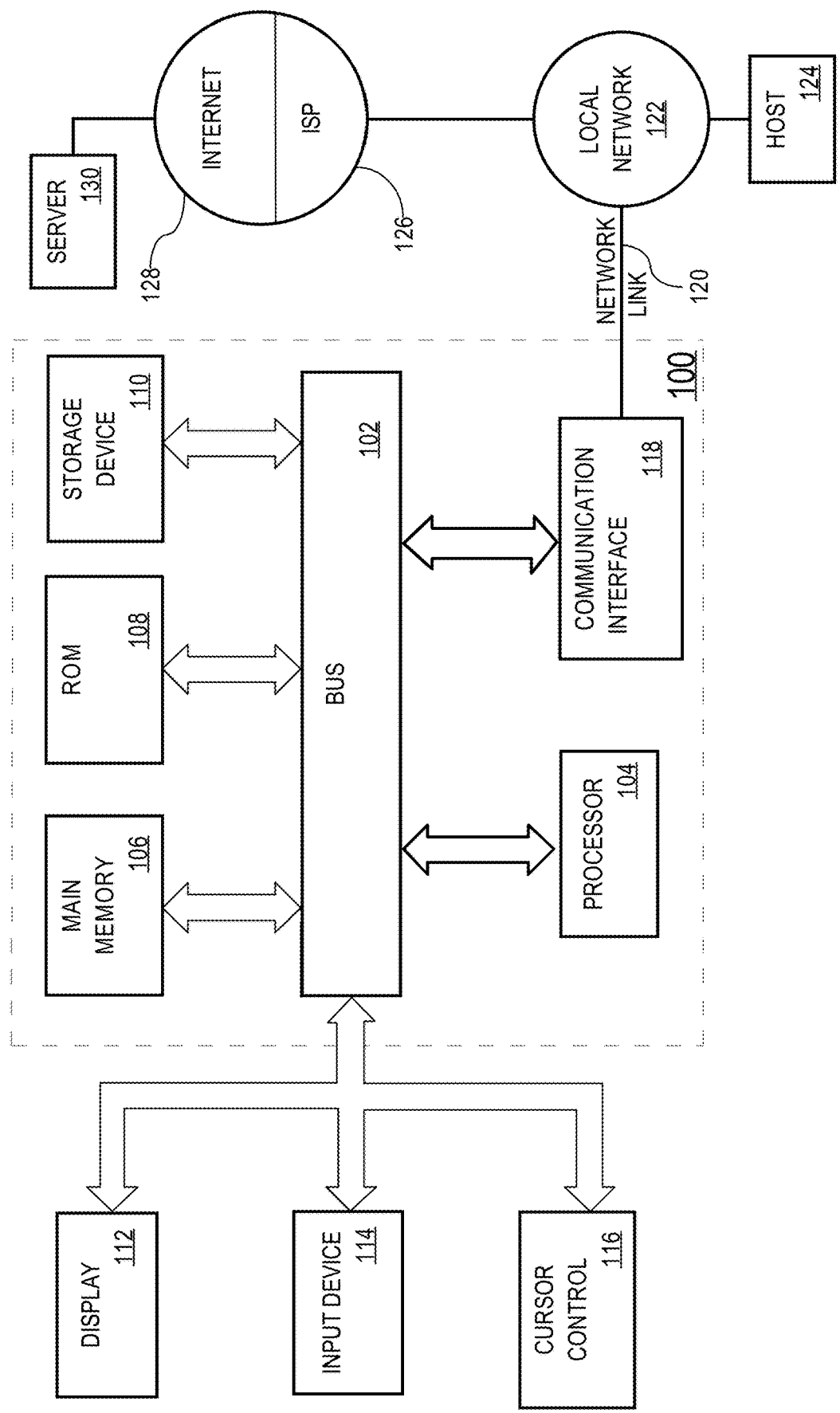
FIG. 1 is a very general block diagram of a computer system in which software-implemented processes of the present invention may be embodied.

For example, FIG. 1 is a block diagram that illustrates a computer system 100 upon which an embodiment of the invention can be implemented. Computer system 100 includes a bus 102 or other communication mechanism for communicating information, and a hardware processor 104 coupled with bus 102 for processing information. Hardware processor 104 can be, for example, a general-purpose microprocessor. Although only one hardware processor 104 is shown in FIG. 1, computer system 100 can have more than one hardware processor 104 coupled to bus 102 for processing information.

Computer system 100 also includes a main memory 106, such as a random-access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 can be coupled via bus 102 to a display 112, such as a liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

A touch-sensitive surface can overlay display 112 as an input device 114 to form a touch-sensitive display that provides an input interface and an output interface between the system 100 and a user. The touch-sensitive surface can be a sensor or set of sensors that accepts input from the user based on haptic and/or tactile contact. Contact with the touch-sensitive surface can be made by the user with a stylus or set of styluses or a finger or a set of fingers. The touch-sensitive surface can detect contact and any movement or breaking thereof using any of a plurality of touch sensing techniques now known or later developed including, but not limited to, capacitive, resistive, infrared, and acoustic wave techniques, as well as other proximity sensor arrays or other elements for detecting one or more points of contact, movement of contact, and breaking of contact with the touch-sensitive surface.

Although display 112, input device 114, and cursor control 116 are illustrated outside the dashed box representing computer system 100 in FIG. 1, it should be understood that one or more of display 112, input device 114, and cursor control 116 can be part of the form factor of the computer system 100. For that matter, although main memory 106, ROM 108, storage device 110, bus 102, processor 104, and communication interface 118 are illustrated inside the dashed box representing computer system 100, it should be understood that one or more of these components can be external to the form factor of the computer system 100 and operatively coupled to the form factor through a peripheral interface.

Computer system 100 can implement the techniques described herein using customized hard-wired logic, one or more ASICs or FPGAs, firmware and/or program logic which, in combination with the computer system, causes or programs computer system 100 to be a special-purpose machine. According to one embodiment, the techniques herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "storage media" as used herein refers to any non-transitory media that store data and/or instructions that cause a machine to operation in a specific fashion. Such storage media can comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid-state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 can be an integrated service digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code can be executed by processor 104 as it is received, and/or stored in storage device 110, or other non-volatile storage for later execution.

The above-described computer hardware is presented for purposes of illustrating the basic underlying desktop, mobile, and server computer components that can be employed for implementing the present invention. For purposes of discussion, the following description will present example in which it will be assume that there exists a "server" (e.g., a web server, capable of hosting methods of the present invention as web services) that communicates with one or more "clients" (e.g., desktop, mobile, and portable computers, from which users log on to the server in order to use the web services). The present invention, however, is not limited to any particular environment or device configuration. In particular, a client/server distinction is not necessary to the invention, but is simply a suggested framework for implementing the present invention. Instead, the present invention can be implemented in any type of system architecture or processing environment capable of supporting the methodologies of the present invention presented in detail below, including implementing the methodologies on a standalone computer (i.e., where users log on to the same computer that the computer-implemented methodologies are implemented). Additionally, the following description will focus on content item hosting service providers (e.g., Dropbox, Inc. of San Francisco, Calif., which provides cloud storage, file or folder synchronization, and client software to users) in order to simply the discussion. However, those skilled in the art will appreciate that the system and methodologies of the present invention can be advantageously provided by different types of service providers.

Overview of Team Shared Folders

Classically, shared file system folders have been centralized, such as on a network file server or a network attached storage device. Typically, administrators gave access to such folders by adding users to access control lists associated with the folders. If the administrator forgot to add a user to the access control list, the user didn't have access to the folder. Similarly, if the administrator forgot to remove a user from the access control list, the user had access to the folder after access was no longer authorized. Further, if the network to the file server was down or the file server was otherwise inaccessible, users did not have access to the folder.

In accordance with the present invention, a team shared folder is introduced. Users have access to the team shared folder simply by being a member of the team. A team account manager of the team can grant access to the team shared folder simply by inviting selected users to the team. Similarly, the team account manager can revoke access to the team shared folder simply by removing a user from the team. Unlike typical network file server folders, separate access control list management for the team shared folder apart from user team membership management is not needed to grant and revoke access to the team shared folder, thereby reducing administrative steps necessary to effectively manage access to the team shared folder.

In accordance with another aspect of the present invention, the team shared folder is stored at a server and synchronized with copies of the team shared folder on linked client computing devices of team members. Since the linked computing devices have copies of the team shared folder, the team members can access the team shared folder contents even when network access to the server is unavailable.

In one usage scenario, after the team account manager invites a user to the team and the user accepts the invitation, the current contents of the team shared folder at the server are automatically synchronized with the new user's computing device. This automatic synchronization creates a copy of the team shared folder and its contents at the new user's computing device which can be accessed by the new user even when network access to the server is unavailable.

In another usage scenario, after the team account manager removes a user from the team, the copies of the team shared folder at the removed user's linked computing devices are automatically deleted. This automatic deletion prevents the removed user having access to the team shared folder after the user is no longer a member of the team.

The architecture and operation of an example content item sharing and synchronization system implementing team shared folders will now be described in further detail.

Networked Computing Environment

Figure 2:
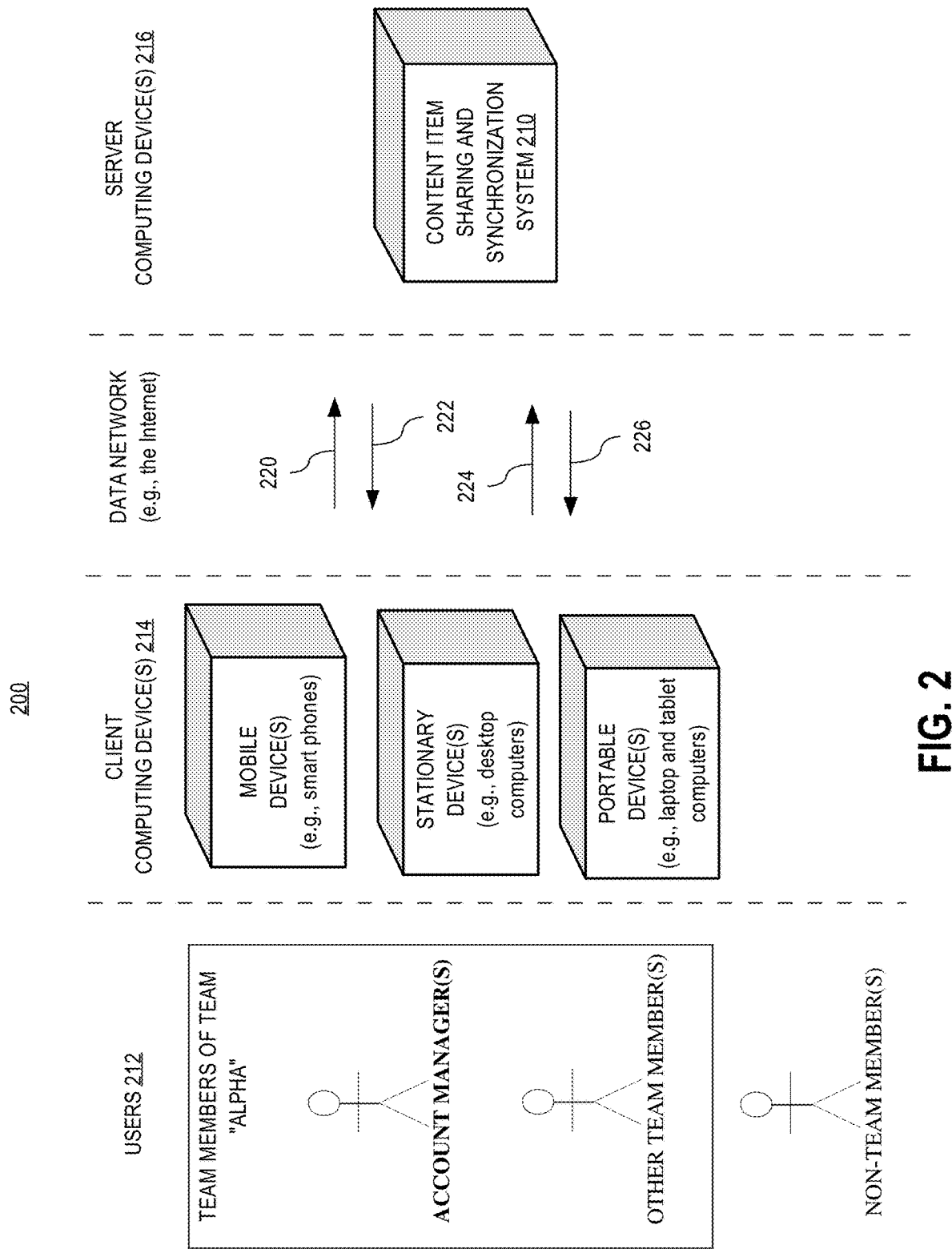
FIG. 2 is a block diagram illustrating a networked computing environment that includes a content item sharing and synchronization system in accordance with some embodiments of the present invention.

FIG. 2 is a block diagram illustrating networked computing environment 200 that includes content item sharing and synchronization (CISS) system 210 in accordance with some embodiments of the present invention. Environment 200 includes different types of users 212 viewed from the perspective of CISS system 210.

User Accounts

Users 212 can have accounts with the CISS system 210. CISS system 210 can store user account information in an account database (not shown). User accounts can be associated with credential information. Credential information is any information CISS system 210 can use to authenticate users 212. Non-limiting examples of credential information include username and password information and digital cryptographic certificate information. Users 212 can authenticate with CISS system 210 by presenting valid credential information. For example, a user can authenticate with CISS system 210 by presenting a valid username and password associated with an account.

Authenticated Sessions

When a user 212 successfully authenticates with CISS system 210 by presenting valid credential information, CISS system 210 establishes an authenticated session for the user 212. The authenticated session allows the user 212 to interact with the CISS system 210 over a period of time without requiring the user 212 to present valid credential information for each interaction. CISS system 210 can establish an authenticated session using a wide variety of mechanisms depending on the requirements of the implementation at hand and the present invention is not limited to any particular manner for establishing the authenticated session.

In some embodiments, CISS system 210 establishes authenticated sessions by sending a small piece of data to the users' 212 client computing devices 214 that is stored at the client computing devices 214. This small piece of data is sometimes referred to as a "cookie" or "browser cookie". Each cookie can contain information that uniquely identifies the authenticated session to which the cookie pertains. Cookies can be included in network requests 220 and network responses 222 sent between client computing devices 214 and CISS system 210. CISS system 210 can use the authenticated session information in the cookies to identify the users 212 making the network requests 220. While browser cookies are used in some embodiments to establish authenticated sessions for users 212, other mechanisms can be used in other embodiments. For example, an alternative to using browser cookies could include CISS system 210 embedding authenticated session information in uniform resource locators (URLs) of web pages served by CISS system 210 to client computing devices 214 in network responses 222.

User Interaction

Users 212 interact with CISS system 210 in the context of an authenticated session. User interaction can involve users 212 sending network requests 220 to CISS system 210 from their client computing devices 214. User 212 interaction also involve users 212 receiving network responses 222 at their client computing devices 214 from CISS system 210 in response to the network requests 220.

Users 212 can cause network requests 220 using one or more different types of client applications (not shown) executing on client computing devices 214. Users 212 can receive network responses 222 also at the client applications. Typically, network requests 220 will be caused by users 212 interfacing with graphical user interfaces (GUIs) presented to users 212 by the client applications at client computing devices 214. Such interfacing can include, but is not limited to, entering text into a text form field and activating a GUI element (e.g., a button, a menu, checkbox, etc.) using a pointing device (e.g., a mouse) or a touch-gesture on a touch-screen display. Typically, network responses 222 contain presentation information that can be used by the client applications to render and display the GUIs. In some embodiments, the different types of client applications include standard web browsing software (e.g., INTERNET EXPLORER, CHROME, FIREFOX, OPERA, SAFARI, or the like), mobile web applications, and dedicated "thick-client" software applications. In some embodiments, network requests 220 and network responses 222 are formatted in accordance with the Hyper Text Transfer Protocol (HTTP) or the Secure-Hyper Text Transfer Protocol (HTTPS). In some embodiments, the presentation information is formatted in accordance with the HyperText Markup Language (HTML) and the JAVASCRIPT programming language. However, it should be understood that network requests 220, network responses 222, and presentation information can be formatted in a wide variety of different ways according to the requirements of the particular implementation at hand and the present invention is not limited to any particular formatting scheme.

Content Items

User accounts stored at CISS system 210 can be associated with a set of content items also stored at CISS system 210. Content items can include, but are not limited to, files and folders. A file can be any named logical collection of data. Files can include, but are not limited to, digital documents (e.g., .DOC, .PDF, .XLS, .TXT, and other document file types), digital audio files (e.g., .WAV, .M4A, .MP3, .AAC, and other digital audio file types), digital video files (e.g., .AVI, .MOV, .MP4, and other video file types) and digital image file (e.g., JPEG, .TIFF, GIF, PNG, and other image file types). A folder is a named logical collection of one or more files and/or one or more folders. A content item that is associated with only one user account can be considered private to that account. A content item that is associated with more than one user account can be considered shared between the accounts.

CISS system 210 can support version history with respect to content items stored at CISS system 210. The version history can also be stored in the form a content item journal similar to a file system journal, for example. The version history can allow users 212 to recover previously deleted content items from the version history. Similarly, the version history can allow users 212 to restore previous versions of content items that have been edited. The version history for a content item can be a sliding window (e.g., the past 30 days) or since the content item was created.

Teams

A user account can belong to a "team" of accounts. A team is a set of one or more user accounts. For example, a business may have a "sales" team, a "marketing" team, a "finance" team, etc. A user account that belongs to a team is referred to herein as a "team account". At least one team account of a team is for a team account manager. The team account manager has special privileges with respect to the team. In particular, the team account manager can invite other users to the team, can remove users from the team, can activate the team shared folder, and deactivate the team shared folder. These operations that can be performed by the team account manager are described in greater detail below.

Users 212, including team account managers, that authenticate with a team account associated with a team are referred to herein as "team members" of the team. Users 212 that authenticate with an account not associated with the team are referred to herein as "non-team members" with respect to that team. For example, in FIG. 2 some users 212 are shown as being members of team "Alpha" while others users 212 are shown as being non-team members with respect to team "Alpha". Further, while only one team, namely team "Alpha", is shown in FIG. 2, it should be understood that CISS system 210 can support more than one team (e.g., hundreds or thousands or more teams). Further, a non-team member with respect to a team can be a member of one or more other teams. For example, non-team members 212 shown in FIG. 2 that are not members of team "Alpha" may each be members of one or more other teams. Similarly, a team member of a particular team can be also be a member of one or more other teams, including teams that non-team members of the particular team are members of Thus, the terms "team member" and "non-team member" as used herein are relative to a particular team.

Linked Client Computing Devices

Users 212 use client computing devices 214 to interact with CSS system 210. Client computing devices 214 can include mobile computing devices, stationary computing devices, and portable computing devices. Mobile computing devices 214 can include mobile phones and smart phones. Mobile computing devices 214 can be configured with a mobile operating system such as ANDROID, BLACKBERRY, IOS, S40, WINDOWS PHONE, WINDOWS 8, WINDOWS RT, or the like. Stationary computing devices 214 can include desktop computers, workstation computers, and server computers. Stationary computing devices 214 can be configured with a desktop or server operating system such as WINDOWS, MAX OS X, UNIX, LINUX, FREEBSD, and the like. Stationary computing devices 214 can also include set-top computing devices such as gaming consoles, digital media players, or other set-top computing devices operatively coupled to a television. Portable computing devices 214 include tablet computers and laptop computers. Tablet computers can be configured with a mobile operating system such as one of the mobile operating systems listed above or a desktop or server operating system such as one of the desktop or server operating systems listed above. Laptop computers can be configured with a desktop or server operating system such as one of the desktop or server operating systems listed above.

When a user 212 successfully authenticates with an account from a client computing device 214, CSS system 210 can "link" the client computing device 214 to the account. A link between a client computing device 214 and an account can be based on a unique device identifier of the client computing device 214. For example, CSS system 210 can link a client computing device 214 and an account by storing an association between the account and the device's identifier in the account database. A user 212 can link multiple of his or her client computing devices 214 to the same account by successfully authenticating with the account from each of the multiple devices 214.

Content Item Client Synchronization Agents

A client synchronization agent (not shown) can be installed on each of a user's 212 linked client computing devices 214. The client synchronization agent installed on a linked client computing device 214 is configured to communicate and interoperate with CSS system 210 to keep the contents of a client-side content item repository stored at the linked client computing device 214 synchronized with the set of content items associated with an account. Thus, the client-side content item repository can also be considered to be associated with the account. For the purpose of providing clear examples, the client-side content item repository stored at a client computing device 214 and associated with an account is referred to hereinafter as a "client repository" and the set of content items associated with the account stored at CSS system 210 is referred to hereinafter as a "server repository". While the term "repository" is used in both references, it should be understood that a client repository can take a different form than a server repository. For example, a client repository can be a collection of file system files and folders stored and managed by the operating system file system of the client computing device at which the client repository is stored. In contrast, the server repository may be stored in a distributed file system on one or more server computing devices.

To synchronize a client repository with a server repository, the client synchronization agent can send 224 and receive 226 synchronization data to and from CSS system 210. The synchronization data can be formatted according to an application-level networking protocol such as HTTP or HTTPS. The synchronization agent can run continuously on the client computer device 214 and can send 224 and receive 226 the synchronization data automatically without requiring user 212 interaction.

The synchronization agent and CSS system 210 implement a synchronization protocol for keeping the client repository on which the synchronization agent is installed synchronized with the server repository. A wide variety of synchronization protocols may be used depending on the requirements of the implementation at hand and the present invention is not limited to any particular synchronization protocol. For example, the synchronization protocol can be based on delta encoding techniques so that only portions of content items that are changed are sent 224 and received 226 over the data network.

In some embodiments of the synchronization protocol, after a client repository is changed, the synchronization agent sends 224 the change to CSS system 210 to be applied to the server repository. The change can include adding a content item to the client repository, modifying a content item in the client repository, or deleting a content item in the client repository. In some embodiments, multiple changes to the client repository are sent 224 to CSS system 210 in a batch to reduce network communications.

Cross-Device Synchronization

As discussed above, a user 212 can have multiple devices 214 linked to an account. Each of those linked devices can have a synchronization agent installed and a client repository. In some embodiments of the synchronization protocol, changes made to one of the client repositories are synchronized to the other client repositories through the server repository. In particular, the cross-device synchronization can involve the device 214 with the changed client repository sending 224 the change to CSS system 210 which applies the change to the server repository. After applying the change to the server repository, the CSS system 210 then sends 226 the change to the synchronization agents on each of the user's 212 other linked devices 214 to be applied to the other client repositories. In this way, a change to a client repository at one of the user's linked devices 214 is replicated to the client repositories of the other of the user's linked devices 214.

Cross-User Synchronization

As discussed above, a content item can be private to one account or shared among multiple accounts. In some embodiments of the synchronization protocol, when a content item is private to an account, changes to the content item are synchronized only among the devices 214 linked to the account. For example, a private job performance review folder associated with an account may be synchronized only among a user's 212 laptop computer 214 and the user's 212 workstation computer 214. A shared content item, on the other hand, can be synchronized among all devices 214 linked to all of the accounts the content item is shared amongst. For example, a shared sales team folder may be synchronized among all devices 214 linked to all user accounts that the sales team folder is shared with.

Conflict Resolution

In some embodiments of the synchronization protocol, if the same shared content item is changed in two different client repositories of two different devices 214 at the same time, CSS system 210 does not attempt to merge the changes when received 224. Instead, CSS system 210 separately saves the conflicting changes in two versions of the shared content item. One version contains the changes to the shared content item received 224 from one of the devices 214 and the other version contains the changes to the shared content item received 224 from the other device 214.

While in some embodiments conflicts are not merged, it should be understood that CSS system 210 could automatically merge conflicts according to a heuristic or a set of heuristics, which may be user-configurable.

Team Shared Folders

A team shared folder is a special shared content item folder associated with a team. The team shared folder can contain contents in the form one or more shared files and/or one or more shared folders. Thus, the team shared folder can be arranged in a file/folder hierarchy with the team shared folder being the root folder of the file/folder hierarchy.

The team shared folder has at least two states: active and inactive. When active, the team shared folder and all of its contents are shared with all team members. When inactive, the team shared folder and all of its contents are shared with only team members that are team account managers of the team. Further, when inactive, the team shared for and all of its contents are removed from all linked computing devices of all team members that are not team account managers. When active, the team shared folder and all of its contents are synchronized with the client repositories on all linked computing devices of all team members.

When synchronized to a client repository of a team member's linked computing device, the team shared folder can correspond to an operating system file system folder. The team shared folder contents correspond to operating system file system files and folders contained in the operating system file system folder corresponding to the team shared folder.

Creating a Team

Figure 3:
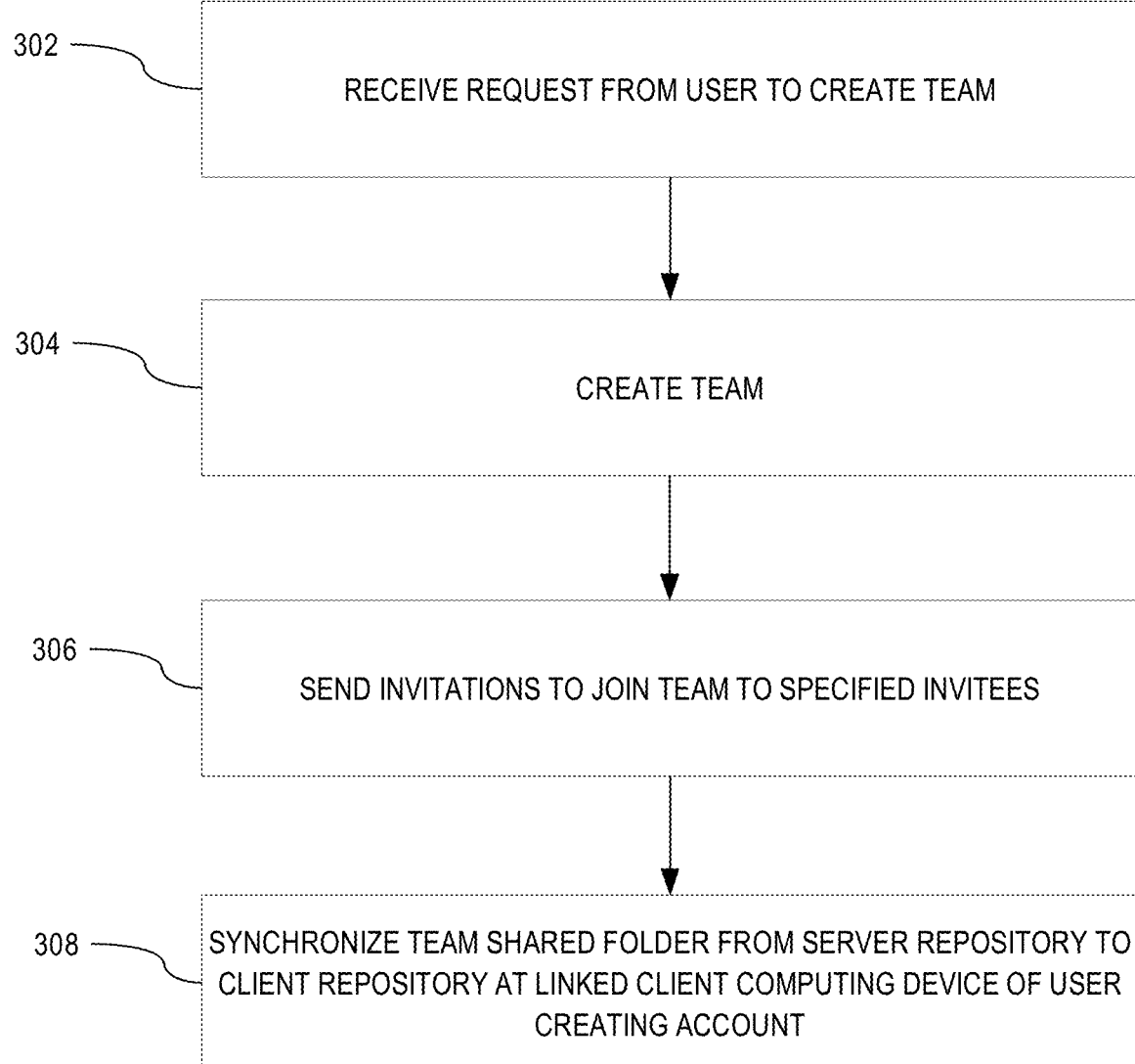
FIG. 3 is a flow diagram illustrating a method for creating a team according to some embodiments of the present invention.

FIG. 3 is a flow diagram illustrating a method for creating a team according to some embodiments of the present invention. Such a method can be performed by one or more computing devices. For example, one or more steps of the example method shown can be performed by CISS system 210. Although steps are depicted in FIG. 3 as being performed in a certain order, some steps can be performed in a different order than depicted and/or performed concurrently with other steps.

In block 302, a request to create a team is received from a user 212. Receiving the request can involve receiving one or more network requests 220 from a client computing device 214 used by the user 212.

The request to create the team can be received in at least two different contexts. In one context, the request to create the team is received as part of a request to create a new account with CISS system 210. In another context, the request to create the team is received as part of a request to convert an existing account of the user 212 to a team account. In both contexts, the resulting account is a team account of the user 212 and associated with the new team.

The request to create the team account can include information provided by the user for creating the team account. The user 212 can provide the information through a graphical user interface presented at the user's 212 client computing device 214. Such information can include a name for the team such as, for example, "Sales Team". Such information can also include a specification of one or more other users 212 to invite to the team. For example, the specification can be in the form of e-mail addresses, usernames, or other account identifiers of the one or more invitees. Further, such information can include a specification of whether the team shared folder is active or inactive.

In block 304, CISS system 210 creates the team by storing metadata in a database or datastore. The stored metadata can include or be based on information provided by the user 212 creating the team. For example, the stored metadata can include the team name, identifiers of the one or more invitees, and the specification of whether the team shared folder is active or inactive. Creating the team can also include storing metadata that indicates that the account of the user 212 who created the team is a team account manager account of the team. Creating the team can also include creating the team shared folder in the server repository for the team.

In block 306, CISS system 210 sends notifications or causes notifications to be sent to the specified invitees. For example, CISS system 210 may send e-mail messages and/or text messages to the specified invitees. The notifications can indicate that the invitee has been invited to join a team, the team name, and the user 212 who created the team. The notifications can also include a hyperlink (URL) which, when activated by the invitee, conveys the invitee's acceptance of the invitation to join the team. Alternatively, the hyperlink can take the invitee to a web page of CISS system 210 that allows the invitee to convey acceptance. If the invitee does not wish to be a member of the team, the invitee can ignore the notification.

In block 308, CISS system 210 synchronizes the team shared folder of the team and its current contents from the server repository to the client computing device 214 of the user 212 that created the team. This synchronization can include sending 226 synchronization data representing the team shared folder created and its current contents in the server repository for the team at block 304. The result of this synchronization is that the client repository at the client computing device 214 of the user 212 that created the team has a copy of the team shared folder and its current contents. The user 212 can now add files and folders to the team shared folder in the client repository and those files and folders will be synchronized back to CISS system 210 for storage in the server repository for the team.

Accepting an Invitation to Join a Team

Figure 4:
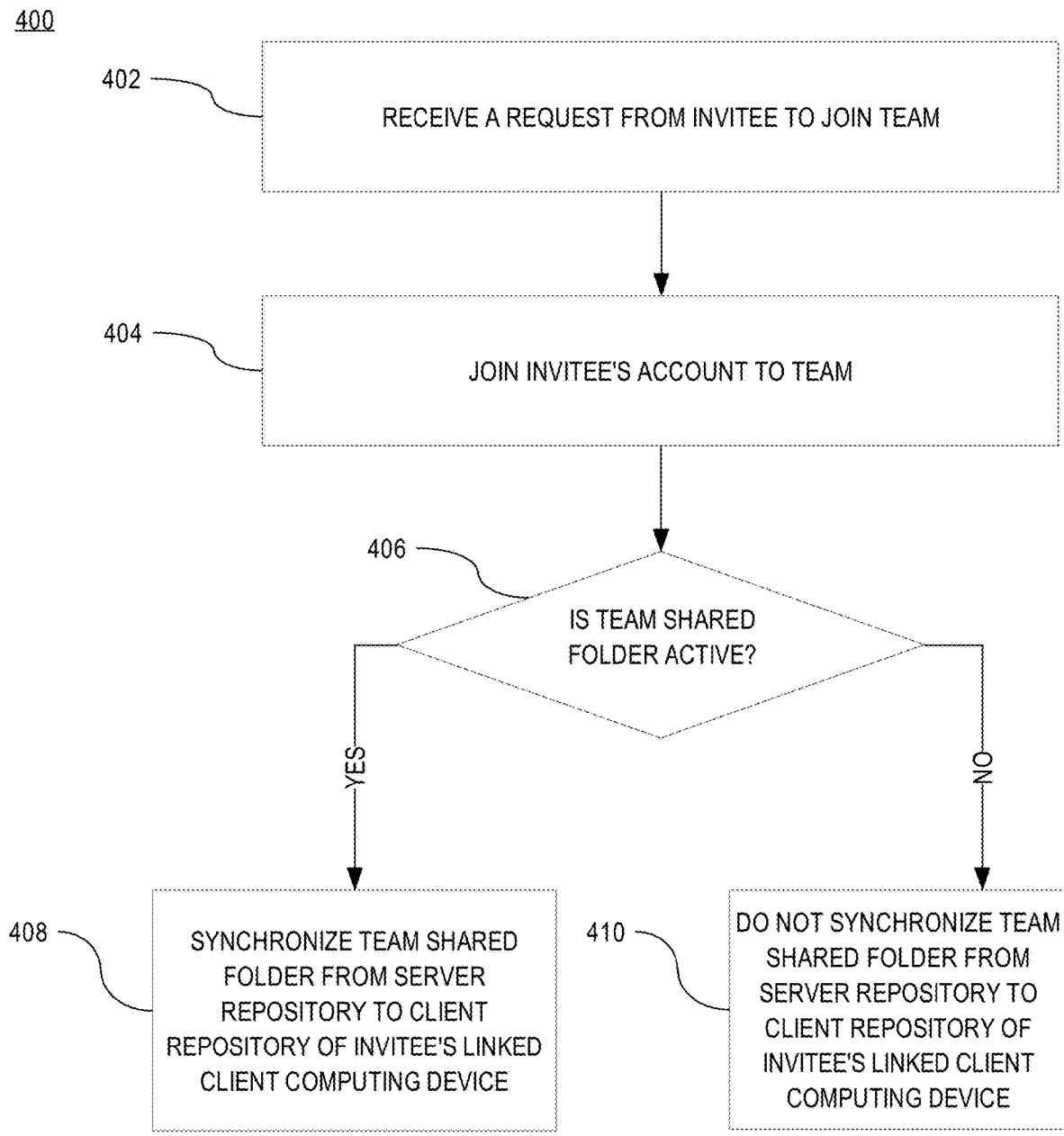
FIG. 4 is a flow diagram illustrating a method for accepting an invitation to join a team according to some embodiments of the present invention.

FIG. 4 is a flow diagram illustrating a method for accepting an invitation to join a team according to some embodiments of the present invention. Such a method can be performed by one or more computing devices. For example, one or more steps of the example method shown can be performed by CISS system 210. Although steps are depicted in FIG. 4 as being performed in a certain order, some steps can be performed in a different order than depicted and/or performed concurrently with other steps.

At block 402, CISS system 210 receives a request from an invitee to join a team for which the invitee received an invitation for. For example, receiving the request to join the team can include CISS system 210 receiving one or more network requests 220 from a client computing device 214 of the invitee. The request to join the team can be made by the invitee in the context of an existing non-team account of the invitee, which case the invitee's existing account is converted to a team account of the team. Alternatively, the request to join the team can be made by the invitee in the context of creating a new account which will also be a team account of the team for the invitee.

At block 404, CISS system 210 joins the invitee's account to the team. This account can be an existing account of the invitee or a newly created account of the invitee as described in the preceding paragraph. Joining the invitee's account to the team as a team account can also include linking the invitee's client computing device 214 from which the request to join the team was sent.

At block 406, CISS system 210 determines whether the team shared folder of the team is active. If active, then, at block 408, CISS system 210 synchronizes the team shared folder of the team and its current contents from the server repository for the team to the linked client computing device 214 of the invitee 212 that accepted the invitation to join the team. This synchronization can include sending 226 synchronization data representing the team shared folder and its current content in the server repository for the team to the linked client computing device 214 of the invitee 212 that accepted the invitation to join the team. The result of this synchronization is that the client repository at the client computing device 214 of the invitee 212 that accepted the invitation to join the team has a copy of the team shared folder and its current contents at the linked client computing device 214.

If, at block 406, CISS system 210 determines that the team shared folder of the team is not active, then, at block 410, CISS system 210 determines not to synchronize the team shared folder of the team to the linked client computing device 214 of the invitee 212. However, even if the team shared folder is not active, the invitee's account is still joined to the team as a team account.

Deactivating the Team Shared Folder

Figure 5:
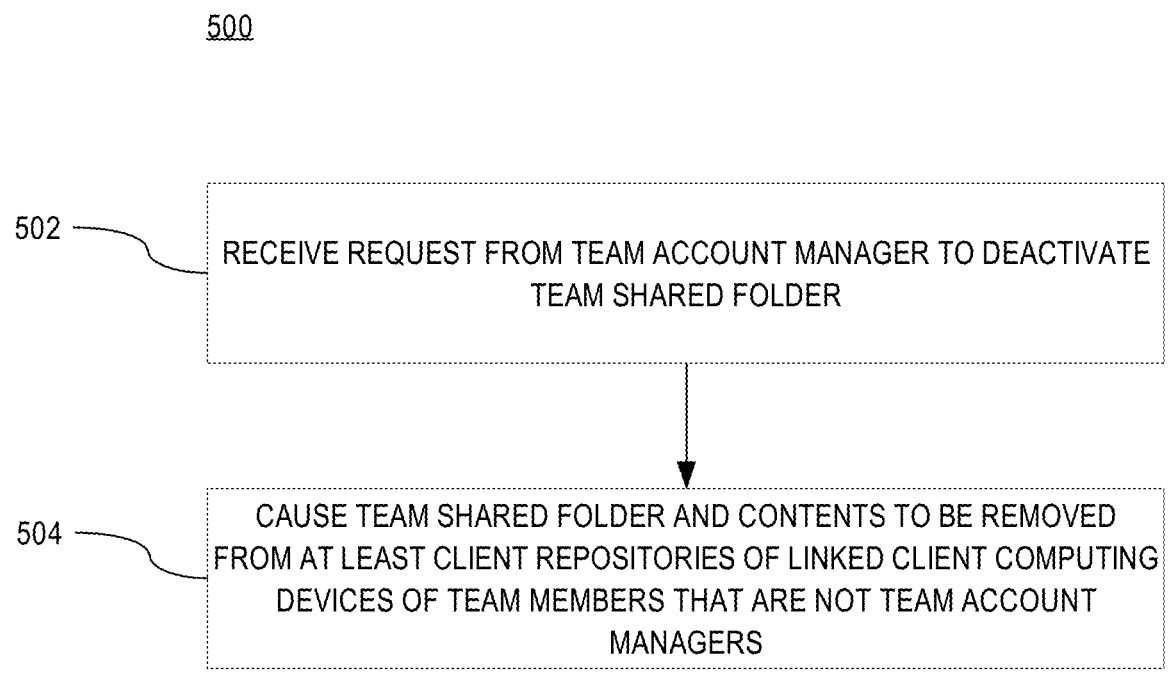
FIG. 5 is a flow diagram illustrating a method for deactivating the team shared folder of a team according to some embodiments of the present invention.

FIG. 5 is a flow diagram illustrating a method for deactivating the team shared folder of a team according to some embodiments of the present invention. Such a method can be performed by one or more computing devices. For example, one or more steps of the example method shown can be performed by CISS system 210. Although steps are depicted in FIG. 5 as being performed in a certain order, some steps can be performed in a different order than depicted and/or performed concurrently with other steps.

A block 502, a request to deactivate the team shared folder of a team is received by CISS system 210 from a team account manager of the team when the team shared folder is active. Receiving the request can involve receiving one or more network requests 220 from a linked client computing device 214 of the team account manager.

At block 504, CISS system 210 causes the copies of the team shared folder in the client repositories of the linked client computing devices 214 of team members 212 that are not team account managers to be removed from the client repositories. This removal can involve CISS system 210 sending 226 synchronization data to the linked client computer of the team members 212 that are not team account managers to remove the team shared folder from the client repositories. Even though the team shared folder is removed from the client repositories, the server repository is retained (i.e., is not deleted). Further, the team shared folder is not removed from the client repositories of the linked client computing devices 214 of the team account managers 212. By not removing the team shared folder from the server repository of the team or from the client repositories of the linked client computing devices 214 of the team account managers 212, the team shared folder can continue to be modified and synchronized among the linked client computing devices 214 of the team account managers 212.

Activating the Team Shared Folder

Figure 6:
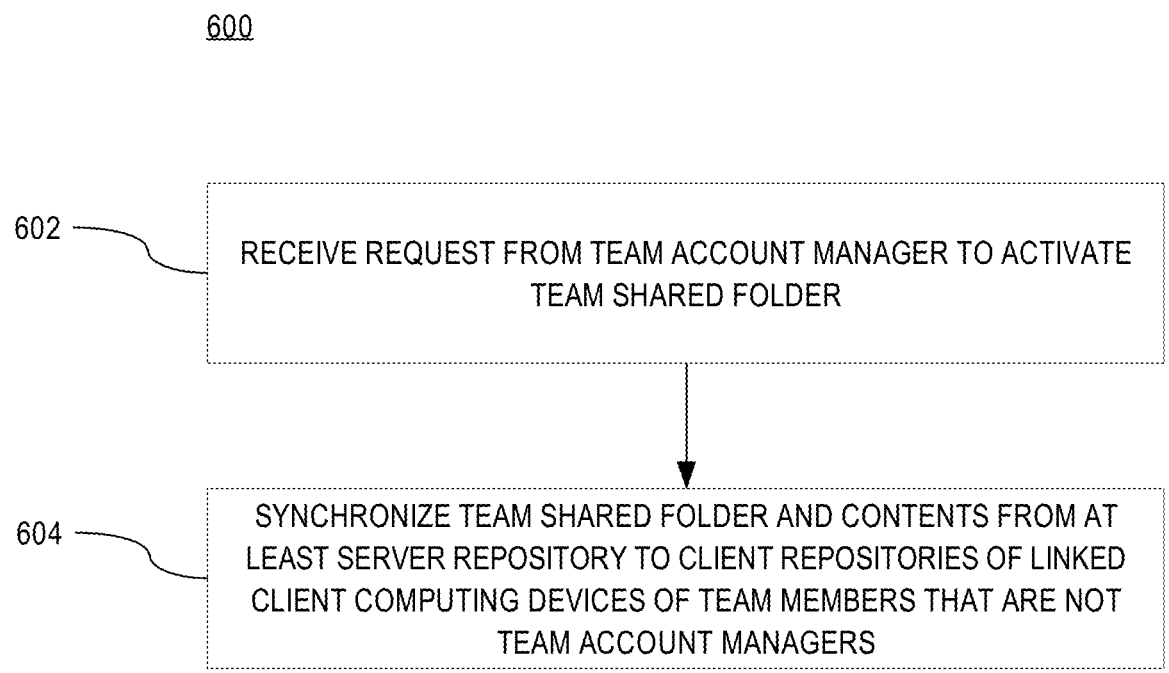
FIG. 6 is a flow diagram illustrating a method for activating the team shared folder of a team according to some embodiments of the present invention.

FIG. 6 is a flow diagram illustrating a method for activating the team shared folder of a team according to some embodiments of the present invention. Such a method can be performed by one or more computing devices. For example, one or more steps of the example method shown can be performed by CISS system 210. Although steps are depicted in FIG. 6 as being performed in a certain order, some steps can be performed in a different order than depicted and/or performed concurrently with other steps.

At block 602, a request to activate the team shared folder of a team is received by CISS system 210 from a team account manager of the team when the team shared folder is inactive. Receiving the request can involve receiving one or more network requests 220 from a linked client computing device 214 of the team account manager.

At block 604, CISS system 210 synchronizes the team shared folder and its current contents from the server repository for the team to at least the client repositories of the linked client computing devices 214 of team members 212 that are not team account managers. This synchronization can involve CISS system 210 sending 226 synchronization data to at least the linked client computing devices of the team members 212 that are not team account managers. The result of this synchronization is that at least the client repositories at the client computing devices 214 of the team members 212 that are not team account managers have a copy of the team shared folder and its current contents at the linked client computing devices 214.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention. Further, the sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising:
   storing user account data specifying a plurality of user accounts that are members of a particular team;
   wherein the user account data specifies that a first user account is a particular member of the particular team;
   storing team shared folder configuration data specifying that a team shared folder of the particular team is active;
   wherein a copy of the team shared folder is stored at a first client computing device linked to the first user account;

receiving a request, from a second client computing device linked to a second user account different from the first user account, to deactivate the team shared folder of the particular team;

based, at least in part, on receiving the request to deactivate, performing a first synchronization with the first client computing device;

wherein performing the first synchronization causes the copy of the team shared folder to be removed from the first client computing device linked to the first user account; and wherein, after performing the first synchronization that causes the copy of the team shared folder to be removed from the first client computing device linked to the first user account, the user account data continues to specify that the first user account is a member of the particular team.

2. The method of claim 1, wherein the request to deactivate is associated with the second user account that is a member of the particular team and that is authorized to restrict access to the team shared folder.

3. The method of claim 1, wherein the request to deactivate is associated with the second user account that is a member of the particular team and that is authorized to restrict access to the team shared folder and wherein the second client computing device is linked to the second user account, the method further comprising:
after receiving the request to deactivate, maintaining a second copy of the particular team shared folder on the second client computing device linked to the second user account.

4. The method of claim 1, wherein the user account data specifies that a third user account is not a member of the particular team, the method further comprising:

receiving a request to join the particular team, wherein the request to join is associated with the third user account;

wherein a third client computing device is linked to the third user account;

based, at least in part, on the team shared folder configuration data, determining that the team shared folder is inactive;

based, at least in part, on the receiving the request to join, updating the user account data to specify that the third user account is a member of the particular team, at a same time the team shared folder configuration data continues to specify that the team shared folder is inactive.

5. The method of claim 1, wherein the user account data specifies that a third user account is not a member of the particular team, the method further comprising:

receiving a request to join the particular team, wherein the request to join is associated with the third user account;

wherein a third client computing device is linked to the third user account;

based, at least in part, on the team shared folder configuration data, determining that the team shared folder is inactive;

based, at least in part, on the receiving the request to join the particular team, modifying the user account data to specify that the second third user account is a member of the particular team, at a same time the team shared folder configuration data continues to specify that the team shared folder is inactive;

after modifying the user account data to specify that the second third user account is a member of the particular team, receiving a request to activate the team shared folder of the particular team;

after receiving the request to activate, performing a second synchronization with the third client computing device linked to the second third user account and performing a third synchronization with the first client computing device linked to the first user account;

wherein performing the third synchronization causes a first copy of the team shared folder to be stored at the first client computing device linked to the first user account;

wherein performing the second synchronization causes a second copy of the team shared folder to be stored at the third client computing device linked to the third user account.

6. The method of claim 5, further comprising:
after storing the first copy of the team shared folder at the first client computing device linked to the first user account and storing the second copy of the team shared folder at the third client computing device linked to the third user account, receiving a request to remove the third user account from the particular team;

modifying the user account data to remove the third user account from the particular team;

the modifying the user account data to remove the third user account from the particular team causing performing a fourth synchronization with the third client computing device;

wherein, at a same time the first copy of the team shared folder is maintained at the first client computing device linked to the first user account, the fourth synchronization causing the second copy of the team shared folder to be removed from the third client computing device linked to the third user account.

7. The method of claim 1, further comprising, prior to the user account data specifying that the first user account is a member of the particular team, sending an invitation to join the particular team to the first client computing device linked to the first user account.

8. The method of claim 7, further comprising:
prior to the user account data specifying that the first user account is a member of the particular team, receiving an indication that the invitation to join the particular team is accepted, wherein receiving the indication causes modifying the user account data to specify that the first user account is a member of the particular team.

9. The method of claim 7, further comprising:
sending the invitation for the first user account to join the particular team;

prior to sending the invitation to the first client computing device linked to the first user account, receiving a request to send the invitation from the second client computing device associated with the second user account that is not the first user account;

wherein the second user account is a member of the particular team and is authorized to restrict access to the team shared folder.

10. The method of claim 1, further comprising
prior to performing the first synchronization, determining whether the team shared folder of the particular team is active or inactive;

wherein determining whether the team shared folder of the particular team is active or inactive comprises examining the team shared folder configuration data associated with the team shared folder that specifies whether the team shared folder is active or inactive.

11. A server computer system comprising:
one or more processors;
one or more storage media storing one or more computer programs for execution by the one or more processors, the one or more computer programs comprising instructions for:
storing user account data specifying a plurality of user accounts that are members of a particular team;
wherein the user account data specifies that a first user account is a particular member of the particular team;
storing team shared folder configuration data specifying that a team shared folder of the particular team is active;
wherein a copy of the team shared folder is stored at a first client computing device linked to the first user account;
receiving a request, from a second client computing device linked to a second user account different from the first user account, to deactivate the team shared folder of the particular team;
based, at least in part, on receiving the request to deactivate, performing a first synchronization with the first client computing device;
wherein performing the first synchronization causes the copy of the team shared folder to be removed from the first client computing device linked to the first user account.

12. The server computer system of claim 11, wherein the request to deactivate is associated with the second user account that is a member of the particular team and that is authorized to restrict access to the team shared folder.

13. The server computer system of claim 11, wherein the request to deactivate is associated with the second user account that is a member of the particular team and that is authorized to restrict access to the team shared folder and wherein the second client computing device is linked to the second user account,
the instructions further configured for:
after receiving the request to deactivate, maintaining a second copy of the particular team shared folder on the second client computing device linked to the second user account.

14. The server computer system of claim 11, wherein the user account data specifies that a third user account is not a member of the particular team, the instructions further configured for:
receiving a request to join the particular team, wherein the request to join is associated with the third user account;
wherein a third client computing device is linked to the third user account;
based, at least in part, on the team shared folder configuration data, determining that the team shared folder is inactive;
based, at least in part, on the receiving the request to join, updating the user account data to specify that the third user account is a member of the particular team, at a same time the team shared folder configuration data continues to specify that the team shared folder is inactive.

15. The server computer system of claim 11, wherein the user account data specifies that a third user account is not a member of the particular team, the instructions further configured for:
receiving a request to join the particular team, wherein the request to join is associated with the third user account;
wherein a third client computing device is linked to the third user account;
based, at least in part, on the team shared folder configuration data, determining that the team shared folder is inactive;
based, at least in part, on the receiving the request to join the particular team, modifying the user account data to specify that the third user account is a member of the particular team, at a same time the team shared folder configuration data continues to specify that the team shared folder is inactive;
after modifying the user account data to specify that the third user account is a member of the particular team, receiving a request to activate the team shared folder of the particular team;
after receiving the request to activate, performing a second synchronization with the third client computing device linked to the third user account and performing a third synchronization with the first client computing device linked to the first user account;
wherein performing the third synchronization causes a first copy of the team shared folder to be stored at the first client computing device linked to the first user account;
wherein performing the second synchronization causes a second copy of the team shared folder to be stored at the third client computing device linked to the third user account.

16. One or more non-transitory computer-readable media storing one or more computer programs for execution by a server computer system, the one or more computer programs comprising instructions for:
storing user account data specifying a plurality of user accounts that are members of a particular team;
wherein the user account data specifies that a first user account is a particular member of the particular team;
storing team shared folder configuration data specifying that a team shared folder of the particular team is active;
wherein a copy of the team shared folder is stored at a first client computing device linked to the first user account;
receiving a request, from a second client computing device linked to a second user account different from the first user account, to deactivate the team shared folder of the particular team;
based, at least in part, on receiving the request to deactivate, causing the copy of the team shared folder to be removed from the first client computing device linked to the first user account; and
wherein, after removal of the copy of the team shared folder from the first client computing device linked to the first user account, the user account data continues to specify that the first user account is a member of the particular team.

17. The one or more non-transitory computer-readable media of claim 16, wherein the request to deactivate is associated with the second user account that is a member of the particular team and that is authorized to restrict access to the team shared folder.

18. The one or more non-transitory computer-readable media of claim 16, wherein the request to deactivate is associated with the second user account that is a member of the particular team and that is authorized to restrict access to the team shared folder and wherein the second client computing device is linked to the second user account, and
wherein the instructions are further configured for:

after receiving the request to deactivate, maintaining a second copy of the particular team shared folder on the second client computing device linked to the second user account.

19. The one or more non-transitory computer-readable media of claim 16, wherein the user account data specifies that a third user account is not a member of the particular team, and wherein the instructions are further configured for:
receiving a request to join the particular team, wherein the request to join is associated with the third user account;
wherein a third client computing device is linked to the third user account;
based, at least in part, on the team shared folder configuration data, determining that the team shared folder is inactive;
based, at least in part, on the receiving the request to join, updating the user account data to specify that the third user account is a member of the particular team, at a same time the team shared folder configuration data continues to specify that the team shared folder is inactive.

20. The one or more non-transitory computer-readable media of claim 16, wherein the user account data specifies that a third user account is not a member of the particular team, and wherein the instructions are further configured for:
receiving a request to join the particular team, wherein the request to join is associated with the third user account;
wherein a third client computing device is linked to the third user account;
based, at least in part, on the team shared folder configuration data, determining that the team shared folder is inactive;
based, at least in part, on the receiving the request to join the particular team, modifying the user account data to specify that the third user account is a member of the particular team, at a same time the team shared folder configuration data continues to specify that the team shared folder is inactive;
after modifying the user account data to specify that the third user account is a member of the particular team, receiving a request to activate the team shared folder of the particular team;
after receiving the request to activate, performing a second synchronization with the third client computing device linked to the third user account and performing a third synchronization with the first client computing device linked to the first user account;
wherein performing the third synchronization causes a first copy of the team shared folder to be stored at the first client computing device linked to the first user account;
wherein performing the second synchronization causes a second copy of the team shared folder to be stored at the third client computing device linked to the third user account.

* * * * *